(12) United States Patent
Pisipati et al.

(10) Patent No.: US 9,633,436 B2
(45) Date of Patent: Apr. 25, 2017

(54) SYSTEMS AND METHODS FOR MULTI-DIMENSIONAL OBJECT DETECTION

(71) Applicant: Infosys Limited, Bangalore (IN)

(72) Inventors: Radha Krishna Pisipati, Hyderabad (IN); Shahanaz Syed, Guntur (IN); Kishore Jonna, Proddatur (IN); Subhadip Bandyopadhyay, Kolkata (IN); Rudra Narayan Hota, Jemadeipur (IN)

(73) Assignee: Infosys Limited, Bangalore (IN)

( * ) Notice: Subject to any disclaimer, the term of this patent is extended or adjusted under 35 U.S.C. 154(b) by 525 days.

(21) Appl. No.: 13/945,830

(22) Filed: Jul. 18, 2013

(65) Prior Publication Data

US 2014/0029852 A1    Jan. 30, 2014

(30) Foreign Application Priority Data

Jul. 26, 2012  (IN) .......................... 3054/CHE/2012

(51) Int. Cl.
  *G06K 9/18*    (2006.01)
  *G06T 7/00*    (2017.01)
  *G06K 9/00*    (2006.01)

(52) U.S. Cl.
  CPC ........ *G06T 7/0042* (2013.01); *G06K 9/00798* (2013.01); *G06K 9/00805* (2013.01); *G06K 9/18* (2013.01)

(58) Field of Classification Search
  None
  See application file for complete search history.

(56) References Cited

U.S. PATENT DOCUMENTS

| | | | |
|---|---|---|---|
| 6,687,577 B2 | 2/2004 | Strumolo | |
| 6,838,980 B2 | 1/2005 | Gloger et al. | |
| 7,212,651 B2 | 5/2007 | Viola et al. | |
| 7,548,634 B2 | 6/2009 | Kudo | |
| 7,576,639 B2 | 8/2009 | Boyles et al. | |
| 8,750,567 B2 * | 6/2014 | Zhang ................... | G06T 7/0083 348/148 |
| 8,923,624 B2 * | 12/2014 | Ushijima ............... | G06K 9/481 348/222.1 |
| 9,052,207 B2 * | 6/2015 | Miksa .................... | G01C 21/30 |

(Continued)

*Primary Examiner* — Fred Hu
(74) *Attorney, Agent, or Firm* — Klarquist Sparkman, LLP (57) ABSTRACT

Systems and methods for multi-dimensional object detection are described. Embodiments disclose receiving image frames, extracting image components in the image frame, identifying line segments in the extracted components, grouping the line segments into groups, based at least in part on one or more similarities between the slope associated with a line segment and the spatial proximity between the line segments, and merging each of the one or more identified line segments in a selected group into a single line segment. Embodiments additionally disclose detecting the position of one or more objects in the image frame by identifying objects in the image frame, producing a second version of the image frame, applying at least one image classifier to the image frame and the second version of the image frame, and identifying coordinates associated with at least one target object. Some embodiments additionally couple lane and object detection with alert generation.

23 Claims, 10 Drawing Sheets

(56) References Cited

U.S. PATENT DOCUMENTS

| | | | |
|---|---|---|---|
| 9,076,065 B1* | 7/2015 | Vijayanarasim-han | ................ G06K 9/6256 |
| 2004/0234136 A1 | 11/2004 | Zhu et al. | |
| 2007/0230792 A1 | 10/2007 | Shashua et al. | |
| 2009/0018712 A1 | 1/2009 | Duncan et al. | |
| 2009/0303026 A1 | 12/2009 | Broggi et al. | |
| 2010/0026555 A1 | 2/2010 | Whittaker et al. | |
| 2010/0274430 A1 | 10/2010 | Dolgov et al. | |
| 2010/0328316 A1* | 12/2010 | Stroila | ............... G06K 9/00818 345/441 |
| 2011/0249867 A1* | 10/2011 | Haas | ................. G06K 9/00818 382/103 |

* cited by examiner

SYSTEMS AND METHODS FOR MULTI-DIMENSIONAL OBJECT DETECTION

FIELD

The technologies are concerned with the field of multi-dimensional object detection. In particular, the technologies provide an integrated, vision based system based on the capture and processing of received image sequences to enable on road object detection.

BACKGROUND

The application of object detection systems is increasingly relevant across a wide variety of technology domains, including, for example, transport, surveillance, medicine and security. Among these, a particular application of such systems involves aiding the navigation of a vehicle by a user, or, increasingly, in aiding in automating vehicular navigation entirely. In order to be effective, however, automatic vehicle navigation systems must maintain a constant awareness of the surroundings of the vehicle. This includes the timely detection of on-road obstacles, lane markings, and any writing on the road surface.

Existing vehicular navigation systems may use sensors to detect obstacles. However, the usage of sensors is expensive and requires a relatively high degree of maintenance. An additional drawback of sensor based approaches is that such systems cannot generally distinguish between types of obstacles. For example, sensor based systems may be unable to distinguish between a car and a pedestrian, labeling both as generic obstacles in the path of the vehicle. In another approach, number plates may be used to detect cars on the road, but such a technique may necessitate that the object to be detected is in relatively close proximity. Additionally, number plate recognition may require template matching by the navigation system, i.e., matching the detected number plate to a set of known templates. Template matching requires a large amount of data handling, however, and is therefore a serious limitation to real time computation.

In another approach, the geographic features of the road are used for lane detection, but scaling such an approach to the detection of multiple artificial lane markers, and, thusly, multiple lanes is computationally complex and hence problematic.

A successful automatic vehicle navigation system then, at its core, should address different types of detection problems, which may necessitate an integrated approach. Accordingly, there is a need for multi-dimensional object detection that is able to provide timely lane and obstacle detection, recognize existing road signage and provide warnings or alerts to a user when impediments are detected.

SUMMARY

Embodiments of the present invention include a computer implemented method for multi-dimensional object detection, the method comprising receiving, by a computing apparatus, a video sequence consisting of a plurality of image frames, processing a received image frame, wherein processing comprises analyzing the received image frame for the presence of one or more line segments, and analyzing comprises extracting one or more image components in the image frame. An image component is an image element including at least one edge. The embodiment described additionally comprises identifying one or more line segments in the extracted components, grouping the one or more line segments identified into one or more groups, wherein grouping is based at least in part on one or more similarities between the slope associated with a line segment and the spatial closeness between the line segment and one or more other identified line segments, and merging each of the one or more identified line segments in a selected group into a single line segment and identifying the coordinates of at least one merged line segment therefrom. The embodiment additionally comprises detecting the position of one or more objects in the image frame, wherein detecting comprises identifying one or more suspected target objects in the image frame, and a suspected target object is characterized by a variance in at least one image feature, and producing a second version of the image frame without the suspected target objects, and applying at least one image classifier to the image frame and the second version of the image frame, and identifying coordinates associated with at least one target object thereby.

Embodiments additionally include a system for multi-dimensional object detection, the system comprising at least one processor in operable communication with a processor readable memory, the memory containing one or more programming instructions whereby the processor is configured to extract at least one image frame from a received video sequence, process the image frame extracted, wherein processing is performed by a lane detection module, wherein the lane detection module detects one or more edges and one or more line segments in the image frame. The system additionally clusters the one or more line segments into one or more groups, and merges one or more line segments present in each group into one or more corresponding merged line segments. The system additionally comprises an obstacle detection module, wherein the obstacle detection module identifies one or more objects in the image frame and applies at least one image classifier to the image frame and a second image frame generated by the obstacle detection module, wherein the second image frame is a version of the image frame without the identified one or more objects and additionally a character recognition module, wherein the character recognition module runs an optical character recognition operation on the image frame and constructs a character output thereby. The system described may also comprise a coordination module, wherein the coordination module receives information from the lane and obstacle detection modules and generates one or more recommendations, including an alarm and a message display.

DRAWINGS

These and other features, aspects, and advantages of the present invention will be better understood when the following detailed description is read with reference to the accompanying drawings in which like characters represent like parts throughout the drawings, wherein.

While systems and methods are described herein by way of example and embodiments, those skilled in the art recognize that systems and methods for multi-dimensional object detection are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION

The following description is the full and informative description of the best method and system presently contemplated for carrying out the present invention, which is known to the inventors at the time of filing the patent application.

The disclosed implementation addresses the problem of developing a vision based, efficient and integrated view of on road object detection, and embodiments thereof may find utility in the support of automatic vehicle navigation systems, intelligent transport systems and robotics, among other domains. Embodiments of the present disclosure address the detection of multiple lanes and obstacles on those lanes. A successive video frame based exploratory analysis is performed to extract information relevant to the position of a detected object relative to the path of the navigating vehicle.

Moving objects such as pedestrians and cars are recognized as obstacles and cascaded image classifiers are used to detect these obstacles on the road. Clustering and regression techniques are used to detect non-moving objects such as single or multiple road lanes and zebra crossings. Based on the coordinates of the detected obstacles and lanes, implementations described may recognize that the obstacle exists in the same lane as, for example, a vehicle in which it is installed, or in other lanes. In some embodiments, the specific lane in which a detected obstacle resides may be identified. In some embodiments, an OCR technique may be used to recognize and decode safety messages on signboards or roads, thereby aiding in the safe navigation of the vehicle. In some embodiments, zebra crossings may be detected and the detected obstacle coordinates and zebra crossing coordinates may be used in combination to identify obstacles on a zebra crossing. In some embodiments, the output of the detection of lanes and obstacles may be received and coordinated by an alarm generator.

Figure 1:
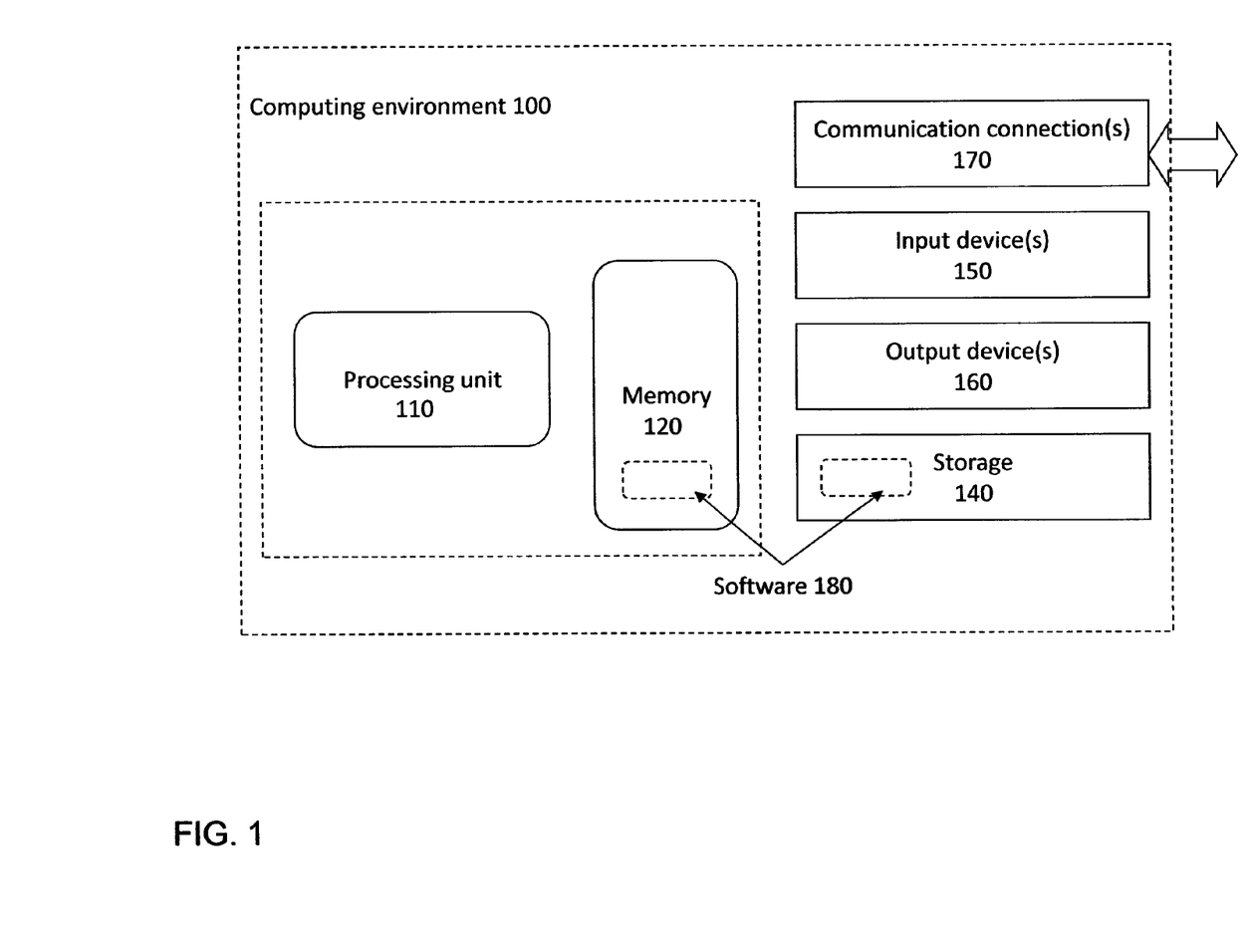
FIG. 1 is an illustration of an exemplary computing environment for the execution of a method for multi-dimensional object detection.

One or more of the above-described techniques may be implemented in or involve at least one computer apparatus in a computing environment. FIG. 1 illustrates a generalized example of a computing environment 100. The computing environment 100 is not intended to suggest any limitation as to scope of use or functionality of described embodiments.

With reference to FIG. 1, the computing environment 100 includes at least one processing unit 110 and memory 120. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. In some embodiments, the memory 120 stores software 180 implementing described techniques.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, CD-RWs, DVDs, or any other medium which may be used to store information and which may be accessed within the computing environment 100. In some embodiments, the storage 140 stores instructions for the software 180.

The input device(s) 150 may be a touch input device such as a keyboard, mouse, pen, trackball, touch screen, or game controller, a voice input device, a scanning device, a digital camera, or another device that provides input to the computing environment 100. In a preferred embodiment, an output device may additionally comprise a camera or an image sensor capable of still photography or video recording. The output device(s) 160 may be a display, printer, speaker, or another device that provides output from the computing environment 100.

The communication connection(s) 170 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 100, computer-readable media include memory 120, storage 140, communication media, and combinations of any of the above.

Figure 2:
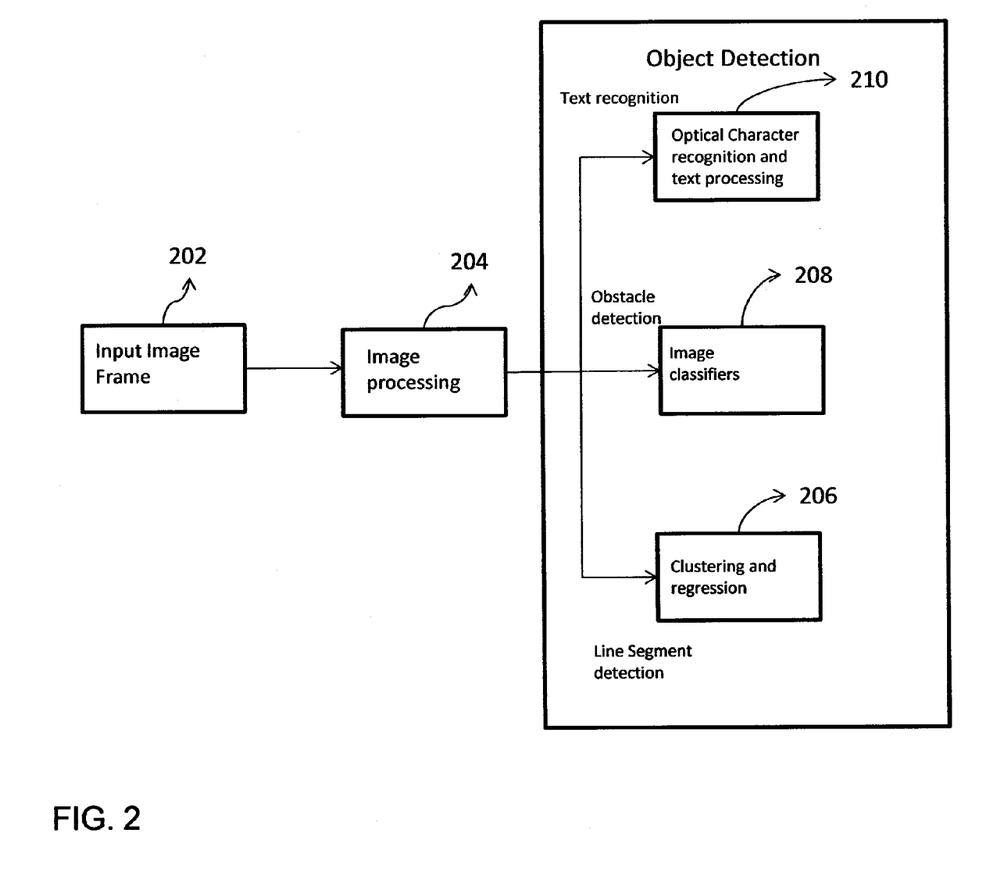
FIG. 2 is an illustrative schematic diagram of components in the object detection system, in accordance with an embodiment.

A multi-dimensional object detection system implemented by means of the computing environment of FIG. 1 is additionally represented, in accordance with a preferred embodiment, by FIG. 2. As indicated by 202, the system may receive an image frame as input from an image source. In some embodiments, the input image source may be a camera or optical sensor communicably coupled with the object detection system. The object detection system may perform image processing 204 in order to extract information from the input image frame. Information extracted may include the position of one or more lanes, obstacles and signage and contents thereof. Information extraction may be performed, in accordance with the preferred embodiment, by means of line segment detection 206 through clustering and regression, obstacle detection by means of one or more image classifiers 208 and text recognition 210 by means of optical character recognition process performed on the received image. In some embodiments, the text output of the optical character recognition process may be checked against a dictionary stored in a non-transitory memory associated with the system. If one or more words are identified as being meaningful, the nearest matching word from the dictionary may be displayed on a display output associated with the system.

Figure 3:
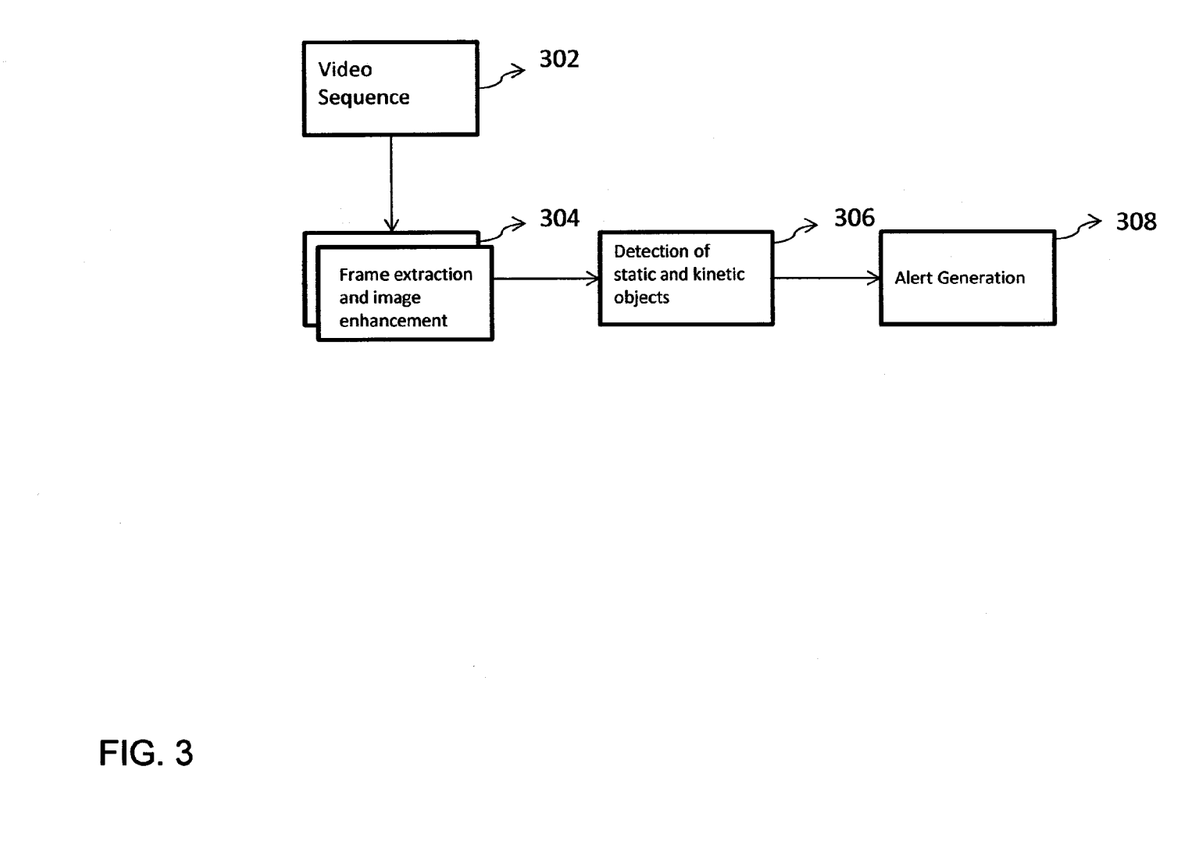
FIG. 3 is an integrated view of an object detection system, in accordance with a preferred embodiment.

The object detection system described may additionally be equipped with alert generation, as represented by FIG. 3. In embodiments having alert generation, the output of the detection of static or kinetic objects 306 from one or more image frames 304 extracted from an input video sequence 302 is processed for one or more alert conditions. Alert conditions may, in some embodiments, include the triggering of an alert if an object is detected as being in the same lane as the input camera or image source, the triggering of an alert if one or more detected lane boundaries are crossed and the triggering of an alert in reaction to signage, such as, for example, the triggering of an alert in response to the detection of a 'STOP' sign.

Figure 4:
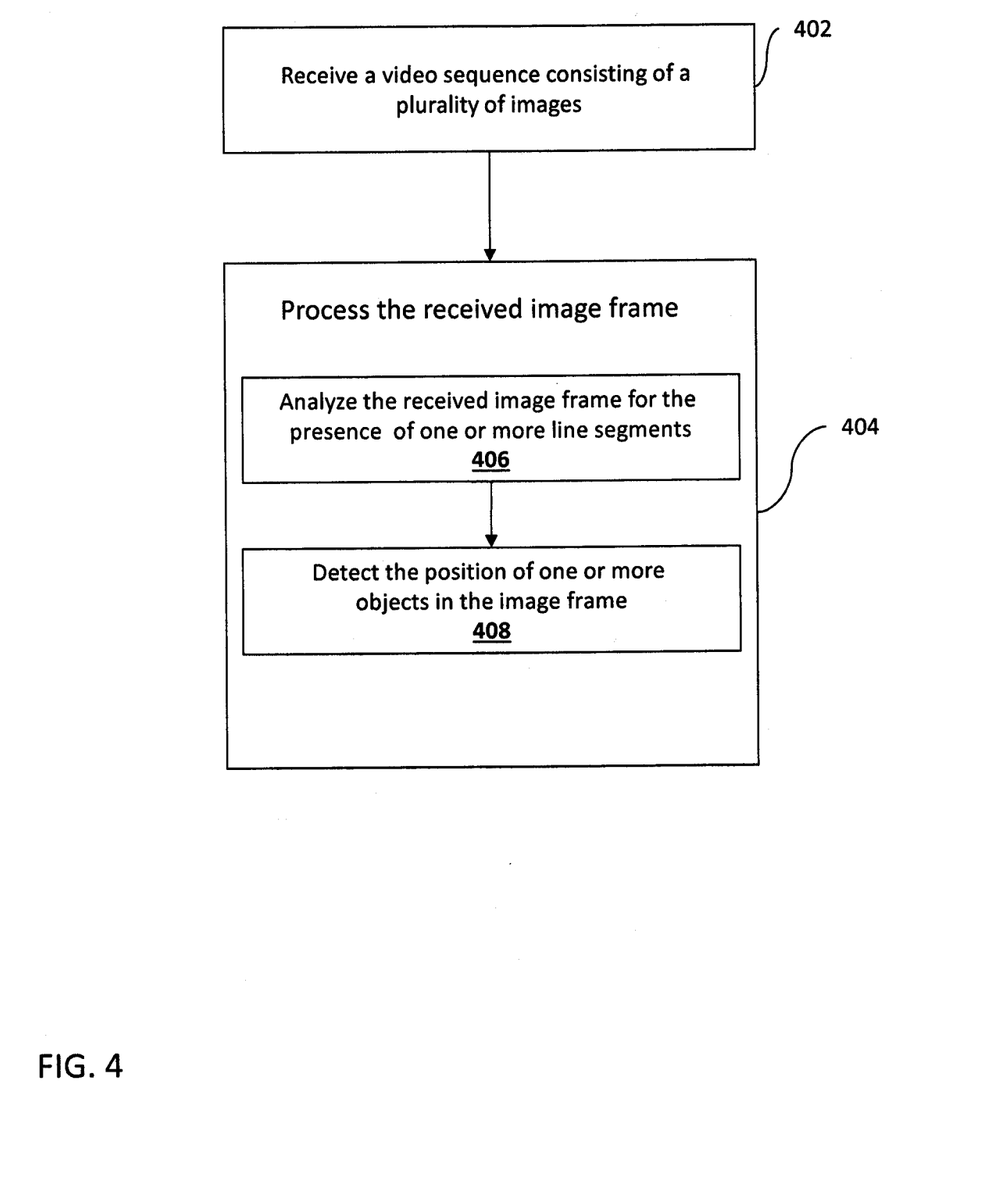
FIG. 4 is a flow diagram depicting steps in a method for multi-dimensional object detection, in accordance with an embodiment.

Steps involved in the implementation of multi-dimensional object detection are further described with reference to FIG. 4. As in a block 402, a video sequence consisting of a plurality of image frames may first be received by a computing apparatus. Then, as in block 404, the received image frame is processed. Processing may involve the analysis of the received image frame for the presence of lanes through the detection of one or more line segments, as in 406, and the presence of obstacles through the detection of the position of one or more objects in the image frame, as in 408. The processing steps are further detailed below by means of these and additional figures representing the operation of multi-dimensional object detection in accordance with one or more embodiments.

Lane Detection

Figure 5:
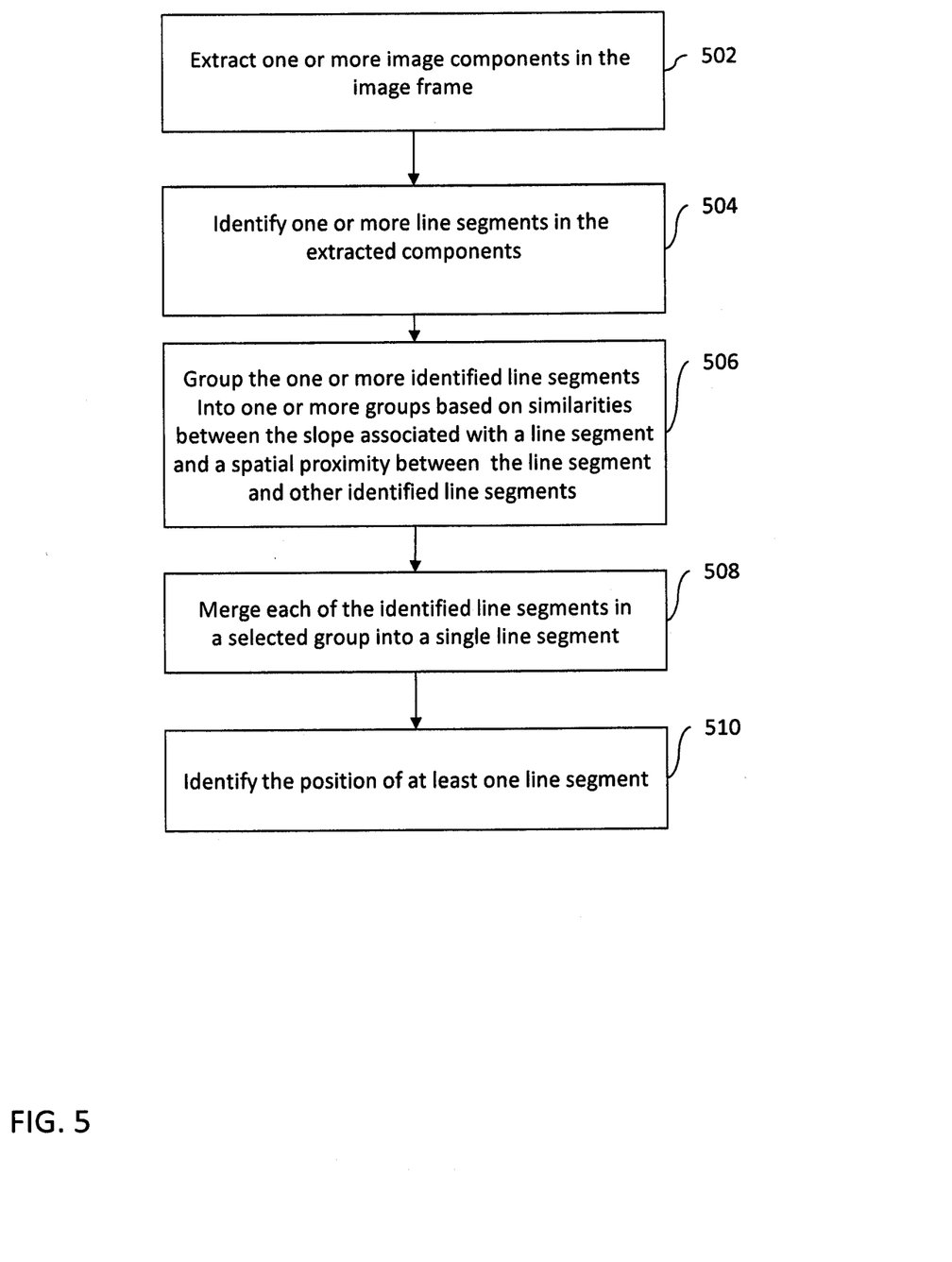
FIG. 5 is a flow diagram depicting steps in the analysis of an image frame whereby one or more line segments in the image frame are detected, in accordance with an embodiment.

More specifically, referring to FIG. 5, the analysis of a received image frame is considered. The analysis, in accordance with an embodiment, may include the extraction of one or more image components in the image frame, as in 502, and the identification of one or more line segments in the extracted components, as in 504. Image components so extracted may include edges within the image frame. In general, lane marks on a road are line or curve like structures, depending on their relative distance to the camera or optical sensor capturing the video sequence input. Disconnected lane markings in relatively close proximity to the optical sensor may form a part of a 'near' view of the image, where the markings are predominantly line like structures. In contrast, markings relatively distant from the image input source, and close to the image horizon, when viewed from the perspective of the image source may appear closer to being curve like structures. As a consequence, the extracted image edges are not always continuous in space and slope, and may contain 'spurious' line segments. The identification of line segments from all extracted edges may therefore require further processing by means of an image classifier algorithm. To that end, the detection of a line segment may, as in some embodiments, be performed by means of a probabilistic Hough transform. The usage of a probabilistic Hough transform over a standard Hough transform to detect line segments from one or more detected edges may yield computational advantages.

The removal of spurious lines and the merging of the disconnected lane markings may be performed by means of grouping the identified line segments into groups based on similarities between the slope associated with a target line segment and a spatial proximity between that line segment and other identified line segments, as in 506.

The grouping may be performed, in accordance with an embodiment, by means of agglomerative hierarchical clustering on the computed slope and Y-intercept of the line segments. An important condition in the formation of a cluster is the similarity, or closeness, between any two segments in the cluster. Equally, the similarity, or closeness, between any two formed clusters is significant in a later merging step. An additional measure for the similarity based clustering or grouping is the average distance of the members of one cluster to all members of any other cluster.

More specifically, a set of line segments with similar angles with respect to an X-axis are found by clustering on the basis of the slope of the line segments. Lines parallel to those in the selected set which are relatively far away from the lines in the set are discarded by clustering on Y-intercept. A clustering algorithm employed in one or more embodiments is detailed in Table 1.

TABLE 1

Input: A Set of samples X = {x1, x2, x3, . . . , xn} of size n representing the slope (or Y-intercept) corresponding to line segments.
K-Threshold to stop merging of sub-clusters.
Output: Clusters with maximum inter class distance greater than K.
Steps:
 1. Start with n disjoint clusters (NoOfClusters=n), each representing one cluster.
 2. Compute the similarity measure, $d(C_i, C_j)$, for each pair of clusters $C_i$ and $C_j$ as in the equation:
 $d(Ci, Cj) = \text{mean}_{(x1, x2) \epsilon C1 \times C2} d(x1, x2)$, where $d(x1, x2)$ is a euclidian distance between $x_1$ and $x_2$ TABLE 1-continued 3. Find the most similar pair of clusters, Ci and Cj , in current clustering, merge them into one cluster if their similarity is less than or equal to K, and consider them as one cluster for further
processing.
4. Decrease NoofClusters by 1.
5. Repeat step 2, 3 and 4 until there are no two clusters with closeness less than K or only a single cluster remains.
6. Return clustered samples.

The clustering method employed may possess a termination condition but not the number of clusters as an input. The output of the grouping step is sets of line segments, each set comprising line segments with a similar slope and Y-intercept. Since lane markings are generally disconnected, such as depicted in, for example, 702 of FIG. 7, the grouped line segments are combined to form a contiguous lane.

Figure 7:
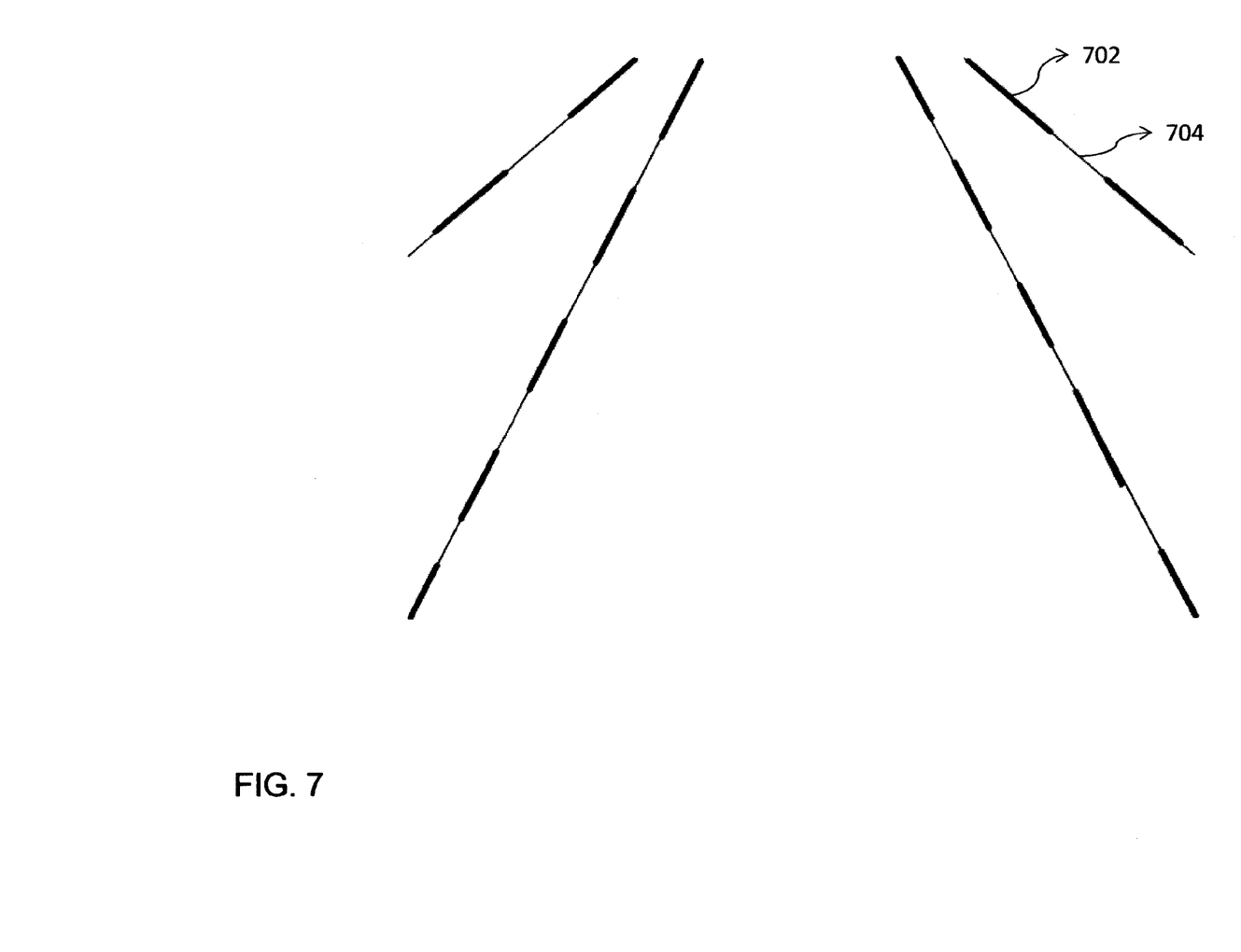
FIG. 7 is an illustrative diagram of an output of a lane detection component of the object detection system, in accordance with an embodiment.

To that end, as in a step 508, each of the identified line segments in a selected group are merged into a single line segment. More specifically, the merging involves one or more assumptions, including firstly, that the lane markings are parallel or near parallel within the frame and that they converge to the vanishing point. For example, FIG. 7 is an illustration of a sample image frame, consisting of lane markings 702 that converge in the direction of the vanishing point. A second assumption may involve the clustering of lane markings in the image frame. If the image frame is considered to comprise four quadrants, then the lane markings of a left lane in the far end of the image may be clustered in the third quadrant of the image, and lane markings in a right lane in the far end of the image may be clustered in the fourth quadrant. A third assumption may involve the position of the lane marking in the near end of the image. Specifically, that the lane markings in the near end of the image are vertical with respect to the boundary of the lower end of the frame, as observed from the perspective of the optical sensor or image source.

In accordance with some embodiments, in order to combine the grouped line segments into one continuous mark, a weighted regression technique may be used to fit the line segments. A regression technique applied may minimize or exclude spurious line segments in order to maximize efficiency. To that end, each data point in the regression operation may be assigned a corresponding degree of importance. More specifically, each line segment may be given a weight factor, where the value of the weight factor reflects the distance from the line segment to other line segments within the same group, i.e. the weight factor associated with a line segment is computed on the basis of the distance of the line segment from other lines in the same set in which it is grouped. Usage of such a weight factor may aid in reducing the effect of spurious line segments, or line segments that are not in relatively close proximity to the group, on the final, merged, line segment. In accordance with some embodiments, a solution equation involved in the weighted regression operation is detailed in table 2.

TABLE 2

In an example multiple regression setup, an $i_{th}$ sample observation on p independent variables is given by
$Xi = (X_{i1}, X_{i2}, X_{i3}, \ldots, X_{ip})$ and one dependent variable Yi.
For a random sample set of size n {(X1, Y1), (X2, Y2), (X3, Y3), ..., (Xn, Yn)}, The matrix representation of a standard least square linear regression is given by:
$Y = X^*\beta + \epsilon$, where TABLE 2-continued $$Y = \begin{bmatrix} Y1 \\ \ldots \\ Yn \end{bmatrix}, X^* = \begin{bmatrix} 1 & X_{11} & X_{12} & \ldots & X_{1p} \\ 1 & X_{21} & X_{22} & \ldots & X_{2p} \\ \ldots & \ldots & \ldots & \ldots & \ldots \\ 1 & X_{n1} & X_{n2} & \ldots & X_{np} \end{bmatrix}$$

and $$\beta = \begin{bmatrix} \beta_1 \\ \ldots \\ \beta_p \end{bmatrix}$$ is the unknown parameter and $\varepsilon$ is the random error in Y.

The least square estimation of β under homoscedastic conditions (equal variance of the error $\epsilon = (\epsilon_1, \epsilon_2, \epsilon_3, \ldots, \epsilon_n)$) is:
$\hat{\beta} = (X^{*T} X^*)^{-1}(X^{*T}Y)$.
By including weighting factors, the equation changes to:
$\hat{\beta} = (X^{*T}\alpha X^*)^{-1}(X^{*T}\alpha Y)$
where α consists of weighting factors associated with each data point, and is represented by:

$$\alpha = \begin{bmatrix} \omega_1 & 0 & \ldots & 0 \\ 0 & \omega_2 & \ldots & 0 \\ \ldots & \ldots & \ldots & \ldots \\ 0 & 0 & \ldots & \omega_n \end{bmatrix}$$

and the weighting factor, $\omega_i$ may be represented as:

$$\omega_i = \sum_{j=1}^{n} \exp^{-d(xi,xj)},$$

where $\omega_i$ is the weight factor for the $i_{th}$ line segment in a group of n line segments and $d(x_i, x_j)$ is the distance between the $i_{th}$ and $j_{th}$ lines.

Then, as in a step 510 of FIG. 5, the position of at least one line segment is identified. The position of the merged line segment produced is noted and, in some embodiments, serves as input to a coordinated alarm generation system. The merged line segment generated may, in some embodiments, be represented through an output display system as in the example element 704, of FIG. 7. The lane detection system may aid an automated navigation system in preventing a vehicle from straying out of lane by locating and identifying one or more lanes from one or more disparate or disconnected lane markings.

Obstacle Detection

Figure 6:
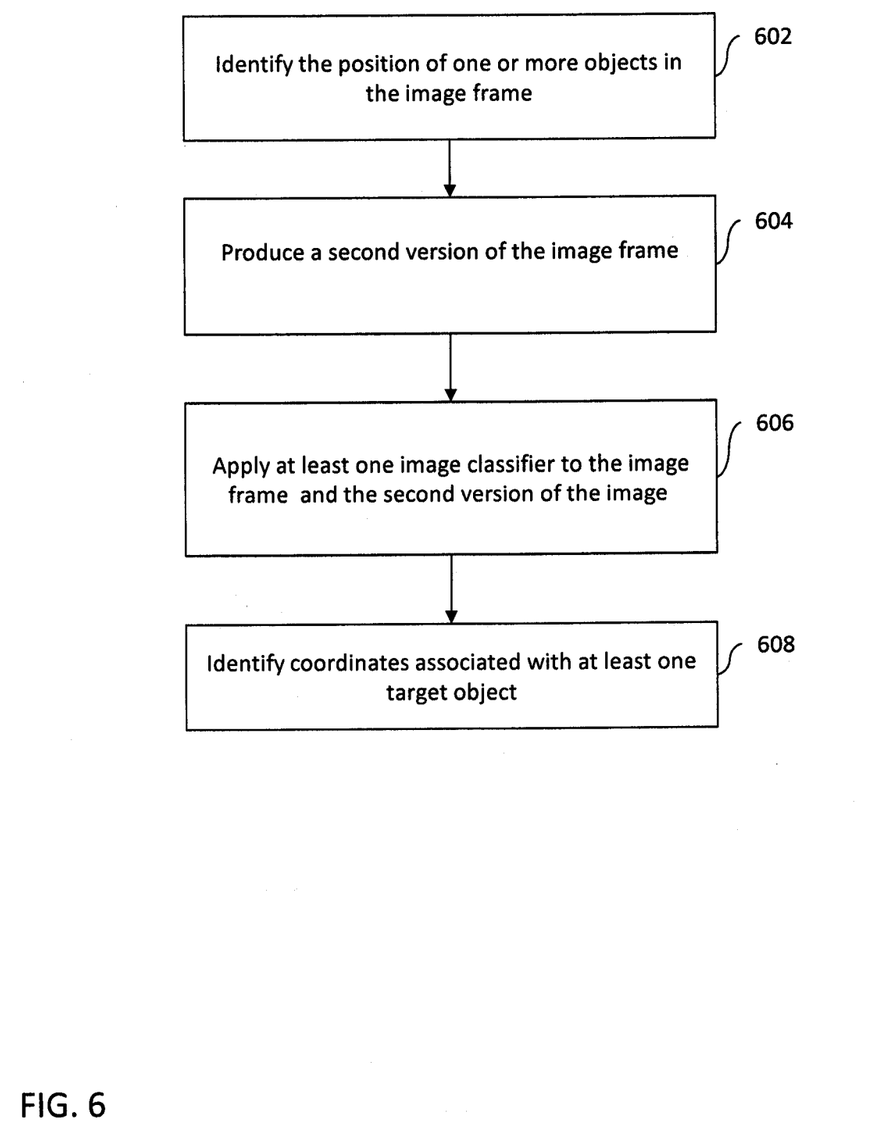
FIG. 6 is a flow diagram depicting steps in the detection of one or more objects in the image frame, in accordance with an embodiment.

Referring now to FIG. 6, a first step in the detection of objects in the image frame is the identification of one or more possible objects in the image frame, as in 602. Then, as in 604, a second version of the image frame may be produced. More specifically, a second set of one or more images are generated by the object detection system. The first, extant set extracted from the video sequence provided by the input source may consist of positive images, that is, images wherein the putative one or more obstacles are clearly visible, and a second, generated, set consisting of 'negative' images wherein the one or more 'negative' images are bootstrap images or images where the putatively identified obstacles are removed.

Then, as in 606, an image classifier may be applied to both versions of the image frame. More specifically, Haar-like features may be successively extracted from the two or more images obtained from 604. At each successive extraction stage a weak image classifier is created with the extracted set of Haar-like features. In a preferred embodiment, the one or more weak image classifiers are used in the development of an advanced image classification algorithm, such as the adaptive boost (Adaboost) learning algorithm.

In a preferred embodiment, at least two classifiers are cascaded to aid in obstacle detection. The classifiers cascaded may include the adaptive boost and support vector machine (SVM) classifiers, where the SVM classifier is developed by extracting feature descriptors from the positive and negative images. The extracted feature descriptors may, in some embodiments, be histogram of oriented gradient (HOG) type descriptors. An individual cascaded classifier formed from the combination thereof may be created for each obstacle.

More specifically, the mechanism for cascading may include routing the output of the Adaboost classifier to the SVM classifier. In some embodiments, the classifiers may be trained prior to deployment in real time detection dependent environments. When an image frame is provided as input to the Adaboost classifier, the image undergoes different stages of processing based on the number of weak classifiers present. Each stage of processing reduces the search area for obstacles within the image by discarding regions that do not contain target objects. When an object is detected using the Adaboost classifier, the detected object is provided as input to the SVM classifier. In some embodiments, the SVM classifier, through the use of the extant HOG features, classifies the detection as a 'true positive' or as a 'false alarm'. Each such detection by the Adaboost classifier is cross verified with the SVM classifier, thereby reducing the probability of a false alarm.

Then, as in 608, coordinates associated with a target object are identified. The detection of an obstacle and the co-ordinates by means of which its position may be identified in the given test image are output by an associated cascaded classifier.

In some embodiments an integrated obstacle detection system aids in the avoidance of collisions by triggering an alert if one or more obstacles, vehicles or pedestrians, are detected. In some embodiments, the co-ordinates are checked to verify if the detected obstacle in the image is in the same lane as the object detection system. The integrated obstacle detection system may coordinate with the integrated lane detection system to verify the position of the detected obstacle with respect to the position of one or more detected lanes. If the obstacle is in the same lane, then an alarm may be triggered by the system. In this way, the described implementation may aid an automatic vehicle navigation system to steer or overtake a vehicle safely, without collisions.

In some embodiments, the received image frame may be preprocessed for better clarity and noise reduction in order to augment accuracy in the object detection operation. The preprocessed image may then be provided as input to the set of cascaded classifiers.

Figure 8:
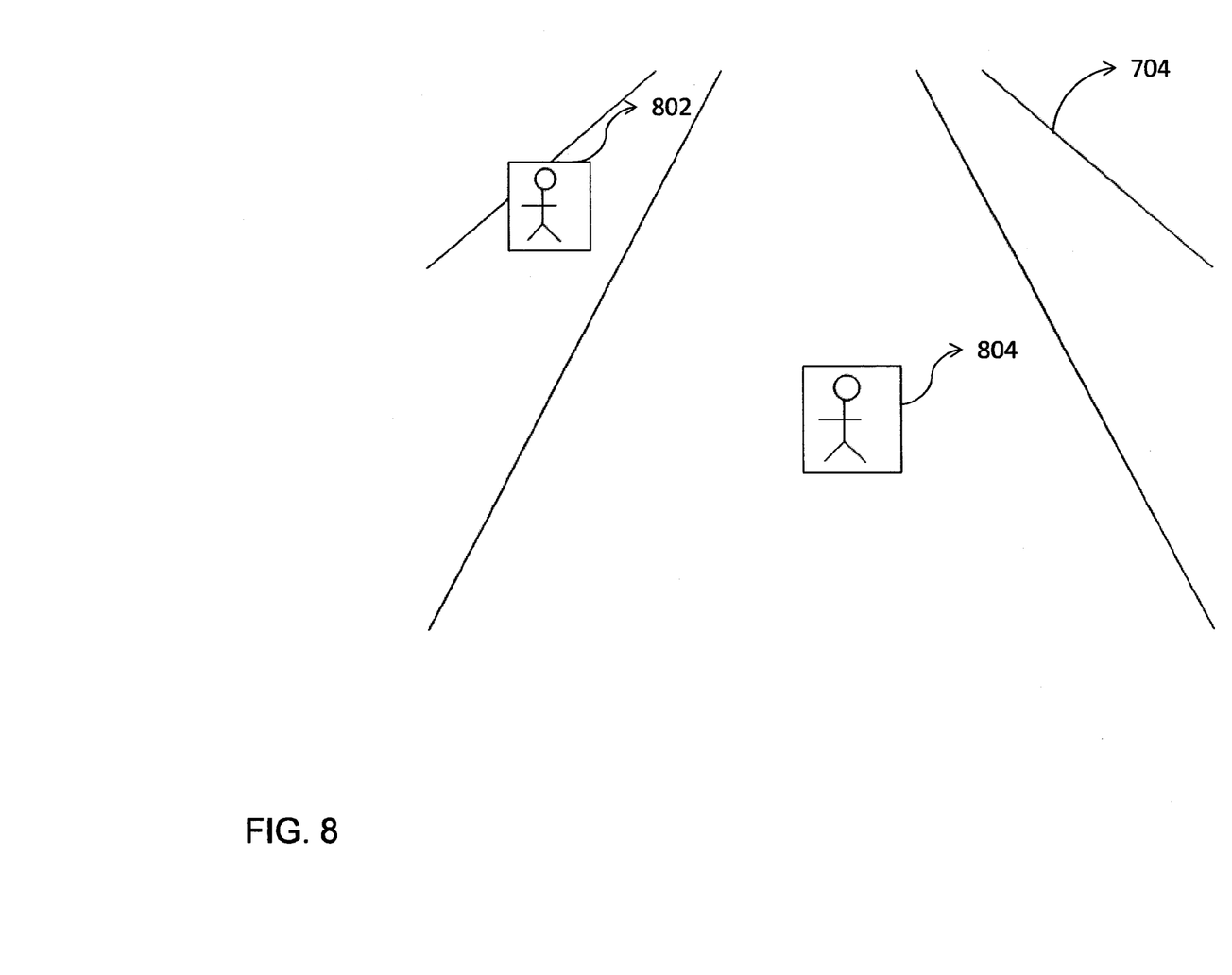
FIG. 8 is an illustrative diagram of an output of an obstacle detection component of the object detection system showing the detection of pedestrians, in accordance with an embodiment.
Figure 9:
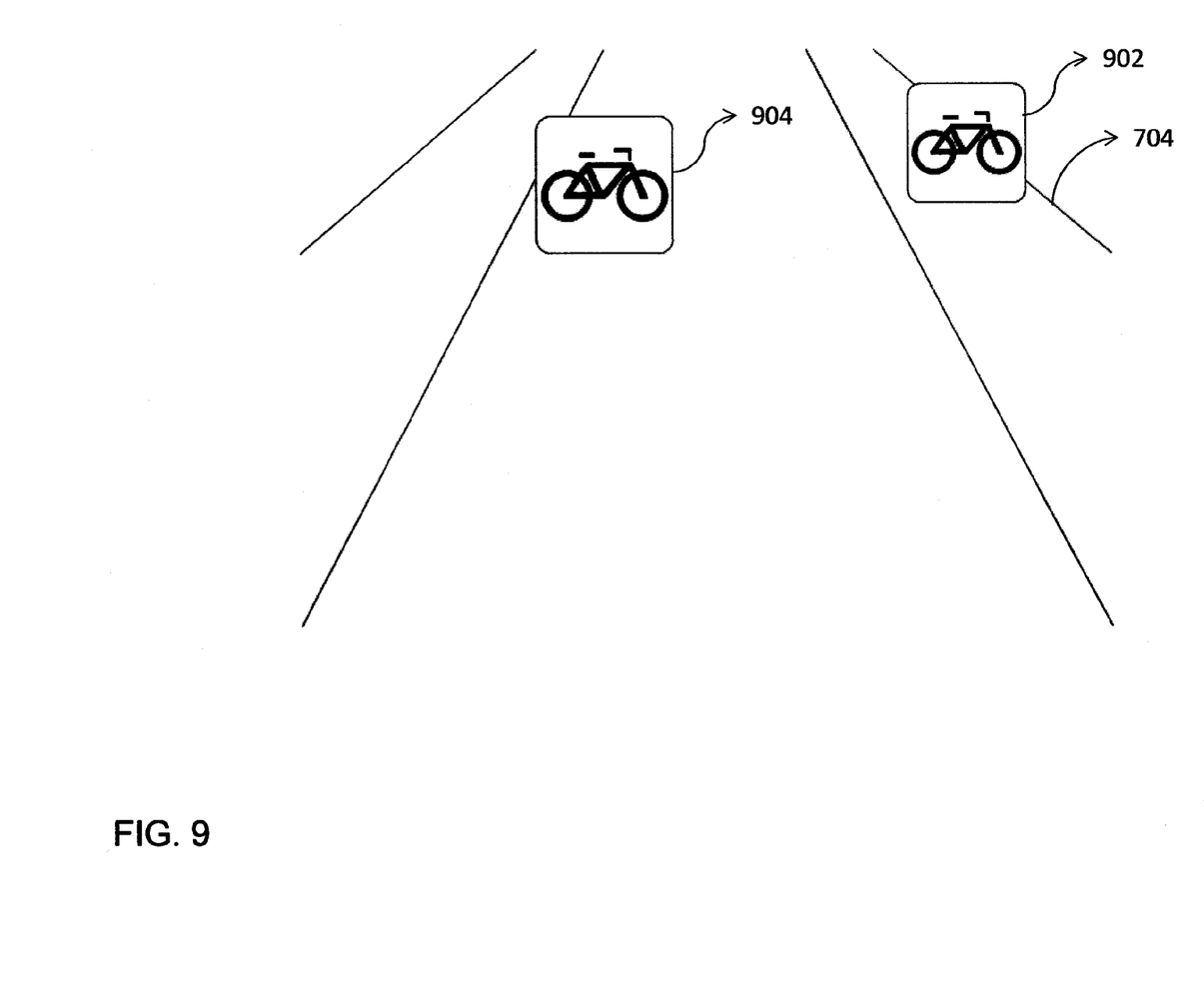
FIG. 9 is an illustrative diagram of an output of an obstacle detection component of the object detection system showing the detection of motorized traffic, in accordance with an embodiment.

In some embodiments, the nature of the object detected may be identified. The output of the object detection system, in accordance with a preferred embodiment, is illustrated by FIGS. 8 and 9. In FIG. 8, the detection of two obstacles is shown, along with their positions with respect to line markings of the type represented by 704. The obstacle detection system receives input from preceding lane detection steps, resulting in the 'merged' lanes shown. In addition to identification of obstacle types through image analysis performed by means of the described image classifiers, the identification of 802 and 804 as being of the type 'pedestrian' may, in some embodiments, be inferred by detecting the nature of the movement exhibited by the obstacle by tracking its displacement across successive image frames in the input video sequence. If the object is moving sideways or crossing the detected lane markings, as opposed to travelling parallel and linearly along the line markings, for instance, the object is likely to be of the pedestrian type. In a similar fashion, the obstacle detection may infer that the objects 902 and 904 of FIG. 9 constitute motorized traffic. Additionally, in some embodiments, successive image frame exploration may be used to infer whether a detected object is static, or moving, and, if in motion, the relative speed of the detected motion with respect to that of the input image source.

Zebra Pattern Detection

Figure 10:
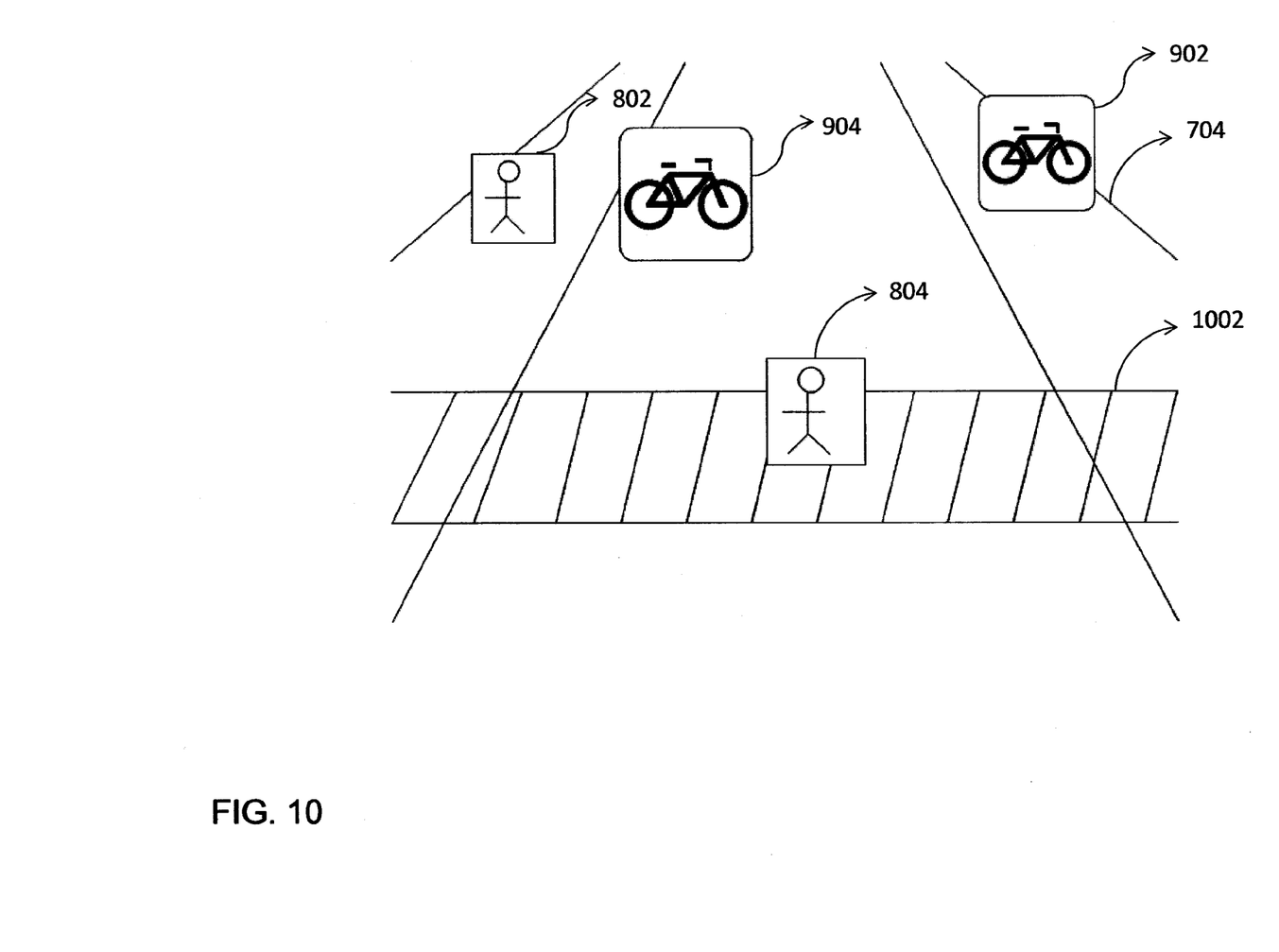
FIG. 10 is an illustrative diagram of an integrated output of the object detection system, in accordance with an embodiment.

FIG. 10 depicts the output of an integrated multi-dimensional object detection system, in accordance with some embodiments, including the detection of a zebra pattern 1002 on the road. More specifically, zebra pattern detection may be performed by finding one or more parallel and equidistant line segments that are also parallel to the y-axis of the examined image frame. The line segments may be obtained through clustering, as above, and finding the cluster centers of the clusters. For a zebra pattern, a hypothetical line intersecting all cluster centers may be parallel to the x-axis of the image frame, thereby allowing a positive inference to be drawn with respect to the existence of a zebra pattern. In some embodiments, the line segments clustered are not exactly parallel to the y-axis of the image, and possess instead a tilt of up to 5 degrees in either direction from the axis. In some embodiments, if the line segments are not parallel to the y-axis but are parallel to each other, then an alarm may be triggered system as such a condition may indicate the presence of a zebra crossing in close proximity to the input source.

Message Detection

Some embodiments may possess message recognition capability, that is, they may recognize text in the image frame and output the text in the form of human understandable missives. Such detection may be performed by means of an integrated optical character recognition (OCR) system or process. Text present in the image is detected by means of executing the OCR process, and the detected words are checked in a dictionary comprising, preferably, words related to traffic signage. The nearest matching word found may then be assigned as the recognized word and output through an associated display device.

The present description includes the best presently-contemplated method for carrying out the present invention. Various modifications to the embodiment will be readily apparent to those skilled in the art and some features of the present invention may be used without the corresponding use of other features. Accordingly, the present invention is not intended to be limited to the embodiments shown but is to be accorded the widest scope consistent with the principles and features described herein.

As will be appreciated by those ordinary skilled in the art, the aforementioned example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

The invention claimed is:

1. A computer implemented method for multi-dimensional object detection, the method comprising:
    receiving, by a computing apparatus, a video sequence consisting of a plurality of image frames; and
    processing, by the computing apparatus, a received image frame of the plurality of image frames, wherein the processing comprises:
        analyzing the received image frame for the presence of one or more line segments, wherein the analyzing comprises:
            extracting one or more image components in the image frame, wherein an image component includes at least one edge;
            identifying one or more line segments in the extracted image components;
            grouping the one or more identified line segments into one or more groups, wherein the grouping is based at least in part on one or more similarities between a slope associated with a line segment and a spatial proximity between the line segment and one or more other identified line segments; and
            merging each of the one or more identified line segments in a selected group into a single straight line segment and identifying the coordinates of the single straight line segment therefrom; and
        detecting the position of one or more objects in the image frame, wherein detecting comprises:
            identifying one or more suspected target objects in the image frame, wherein a suspected target object is characterized by a variance in at least one image feature;
            producing a second version of the image frame by removing the one or more suspected target objects from the image frame, wherein the one or more suspected target objects are not present in the second version of the image frame;
            applying at least one image classifier to the image frame and the second version of the image frame to identify at least one target object; and
            identifying coordinates associated with the at least one target object.

2. The computer implemented method as claimed in claim 1, further comprising categorizing the identified at least one target object into an object class, wherein object classes are selected from a group consisting of lanes, a zebra pattern, obstacles, signs, vehicles and pedestrians.

3. The computer implemented method as claimed in claim 2, further comprising categorizing the identified at least one target object as belonging to an identified lane by comparing coordinates associated with the position of the identified object with coordinates associated with the position of an identified merged line segment.

4. The computer implemented method as claimed in claim 3, further comprising identifying the position of the computing apparatus and associating the position thereof with an identified lane.

5. The computer implemented method as claimed in claim 4, further comprising triggering an alarm if the identified at least one target object is categorized as belonging to the same lane as the computing apparatus.

6. The computer implemented method as claimed in claim 1, further comprising detecting a zebra pattern structure in the image frame, wherein the detecting comprises:
    identifying at least three parallel and equidistant line segments from the group of one or more line segments previously identified, wherein the identified at least three line segments are additionally parallel, with a tolerance of five degrees, to a vertical axis associated with the image frame and the distance between centroids of the adjacent line segments is less than a predetermined constant.

7. The computer implemented method as claimed in claim 6, further comprising presenting an alarm if the identified at least three line segments are not parallel, with a tolerance of five degrees, to the vertical axis associated with the image frame.

8. The computer implemented method as claimed in claim 1, further comprising identifying one or more characters in the received image frame by:
    performing an optical character recognition (OCR) pass on the image frame; and
    reconstructing output generated by the OCR pass.

9. The computer implemented method as claimed in claim 8, further comprising:
    matching the reconstructed OCR output with one or more characters selected from a natural language dictionary.

10. The computer implemented method as claimed in claim 9, further comprising displaying the one or more characters on a display device communicably connected to the computing apparatus.

11. The computer implemented method as claimed in claim 1, further comprising cascading two or more image feature classifiers involved in the detection of an object in the image frame.

12. A system for multi-dimensional object detection, the system comprising:
    at least one processor in operable communication with a processor readable memory, the memory containing one or more programming instructions whereby the processor is configured to:
    extract at least one image frame from a received video sequence; and
    process the extracted image frame, wherein the processing is performed by:
        a lane detection module, wherein the lane detection module detects one or more edges and one or more line segments in the image frame, clusters the one or more line segments into one or more groups, and merges one or more line segments present in each group into one or more corresponding merged straight line segments;
        an obstacle detection module, wherein the obstacle detection module identifies at least one object in the image frame and applies at least one image classifier to the image frame and a second image frame generated by the obstacle detection module by removing the at least one identified object from the image frame, wherein the second image frame is a version of the image frame without the at least one identified object;

a character recognition module, wherein the character recognition module runs an optical character recognition operation on the image frame and constructs a character output thereby; and a coordination module, wherein the coordination module receives information about the one or more corresponding merged line segments from the lane detection module and information about the one or more objects from the obstacle detection module, and generates one or more recommendations, including an alarm and a message display.

13. The system as claimed in claim 12, wherein the processor is further configured to categorize the identified at least one object into an object class selected from a group consisting of lanes, obstacles, signs, vehicles and pedestrians.

14. The system as claimed in claim 13, wherein the processor is further configured to categorize the identified at least one object as belonging to an identified lane by comparing coordinates associated with the position of the identified at least one object with coordinates associated with the position of an identified merged line segment.

15. The system as claimed in claim 14, wherein the processor is further configured to identify the position of the computing apparatus, and associate the position thereof with an identified lane.

16. The system as claimed in claim 15, wherein the processor is further configured to present an alarm if the identified at least one object is categorized as belonging to the same lane as the computing apparatus.

17. The system as claimed in claim 12, wherein the processor is further configured to detect a zebra pattern structure in the image frame, wherein the detecting comprises:

identifying at least three parallel and equidistant line segments from the group of one or more line segments previously identified, wherein the identified at least three line segments are additionally parallel, with a tolerance of five degrees, to a vertical axis associated with the image frame, and the distance between centroids of the line segments is less than a predetermined constant.

18. The system as claimed in claim 17, wherein the processor is further configured to present an alarm if the identified at least three line segments are not parallel, with a tolerance of five degrees, to the vertical axis associated with the image frame.

19. The system as claimed in claim 12, wherein the processor is further configured to identify one or more characters in the received image frame by:

performing an optical character recognition (OCR) pass on the image frame; and reconstructing output generated by the OCR pass.

20. The system as claimed in claim 19, wherein the processor is further configured to:

match the reconstructed OCR output with one or more characters selected from a natural language dictionary.

21. The system as claimed in claim 20, wherein the processor is further configured to display one or more characters recognized on a display device communicably connected to the computing apparatus.

22. The system as claimed in claim 12, wherein the processor is further configured to cascade two or more image feature classifiers involved in the detection of an object in the image frame.

23. A non-transitory computer readable storage medium having stored thereon computer executable instructions for performing a method for multi-dimensional object detection, the method comprising:

receiving a video sequence consisting of a plurality of image frames; and processing a received image frame of the plurality of image frames, wherein the processing comprises:

analyzing the received image frame for the presence of one or more line segments, wherein the analyzing comprises:

extracting one or more image components in the image frame, wherein an image component includes at least one edge;

identifying one or more line segments in the extracted image components;

grouping the one or more identified line segments into one or more groups, wherein the grouping is based at least in part on one or more similarities between a slope associated with a line segment and a spatial proximity between the line segment and one or more other identified line segments; and merging each of the one or more identified line segments in a selected group into a single straight line segment and identifying the coordinates of the single straight line segment therefrom; and detecting the position of one or more objects in the image frame, wherein detecting comprises:

identifying one or more suspected target objects in the image frame, wherein a suspected target object is characterized by a variance in at least one image feature;

producing a second version of the image frame by removing the one or more suspected target objects from the image frame, wherein the one or more suspected target objects are not present in the second version of the image frame;

applying at least one image classifier to the image frame and the second version of the image frame to identify at least one target object; and identifying coordinates associated with the at least one target object.

* * * * *